(12) United States Patent
Herwig

(10) Patent No.: US 7,311,250 B1
(45) Date of Patent: Dec. 25, 2007

(54) RFID WEIGHT-BASED SECURITY METHOD WITH CONTAINER COMPENSATION

(75) Inventor: Nathaniel Christopher Herwig, Lawrenceville, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 10/947,701

(22) Filed: Sep. 23, 2004

(51) Int. Cl.
*G06K 15/00* (2006.01)
(52) U.S. Cl. .............. 235/383; 235/385; 235/378; 235/451; 340/572.1
(58) Field of Classification Search ........... 235/383, 235/385, 380, 378, 451, 492; 340/539.26, 340/539.1, 572.1; 707/1; 705/414
See application file for complete search history.

(56) References Cited

U.S. PATENT DOCUMENTS

| | | | |
|---|---|---|---|
| 5,239,167 A * | 8/1993 | Kipp .................... 235/383 |
| 6,189,789 B1 * | 2/2001 | Levine et al. ........... 235/383 |
| 6,296,184 B1 * | 10/2001 | Dejaeger ............... 235/383 |
| 6,486,768 B1 * | 11/2002 | French et al. ........... 340/5.92 |
| 6,507,851 B1 * | 1/2003 | Fujiwara et al. ........ 707/104.1 |
| 6,707,381 B1 * | 3/2004 | Maloney ............... 340/568.1 |
| 2002/0007618 A1 * | 1/2002 | Armington et al. ........ 53/472 |
| 2004/0015477 A1 * | 1/2004 | Beck et al. .............. 707/1 |
| 2004/0032433 A1 * | 2/2004 | Kodosky et al. ......... 345/810 |
| 2004/0041706 A1 * | 3/2004 | Stratmoen et al. ..... 340/539.26 |
| 2004/0129781 A1 * | 7/2004 | Kreiner et al. .......... 235/385 |

* cited by examiner

*Primary Examiner*—Steven S. Paik
(74) *Attorney, Agent, or Firm*—Paul W. Martin

(57) ABSTRACT

An RFID weight-based security method with container compensation which compares total weights. The security method includes receiving item identification information from RFID labels affixed to items in a container, obtaining a reference container weight, obtaining reference item weights using the item identification information, obtaining a combined weight of the items and the container from a scale, comparing the combined weight with the sum of the reference container weight and the reference item weights, and processing payment for the items if the combined weight is within a predetermined threshold of the sum of the reference container weight and the reference item weights.

12 Claims, 2 Drawing Sheets

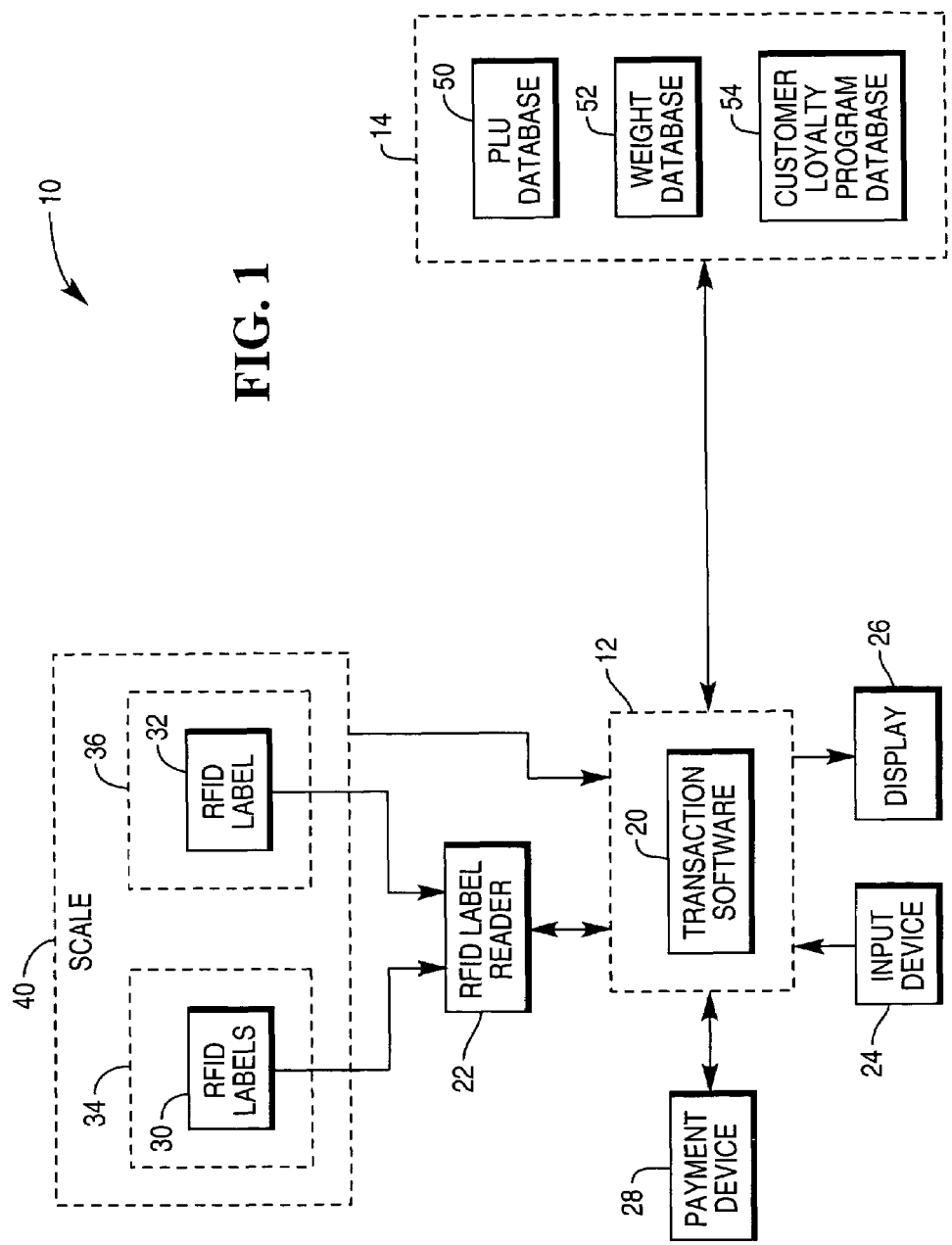

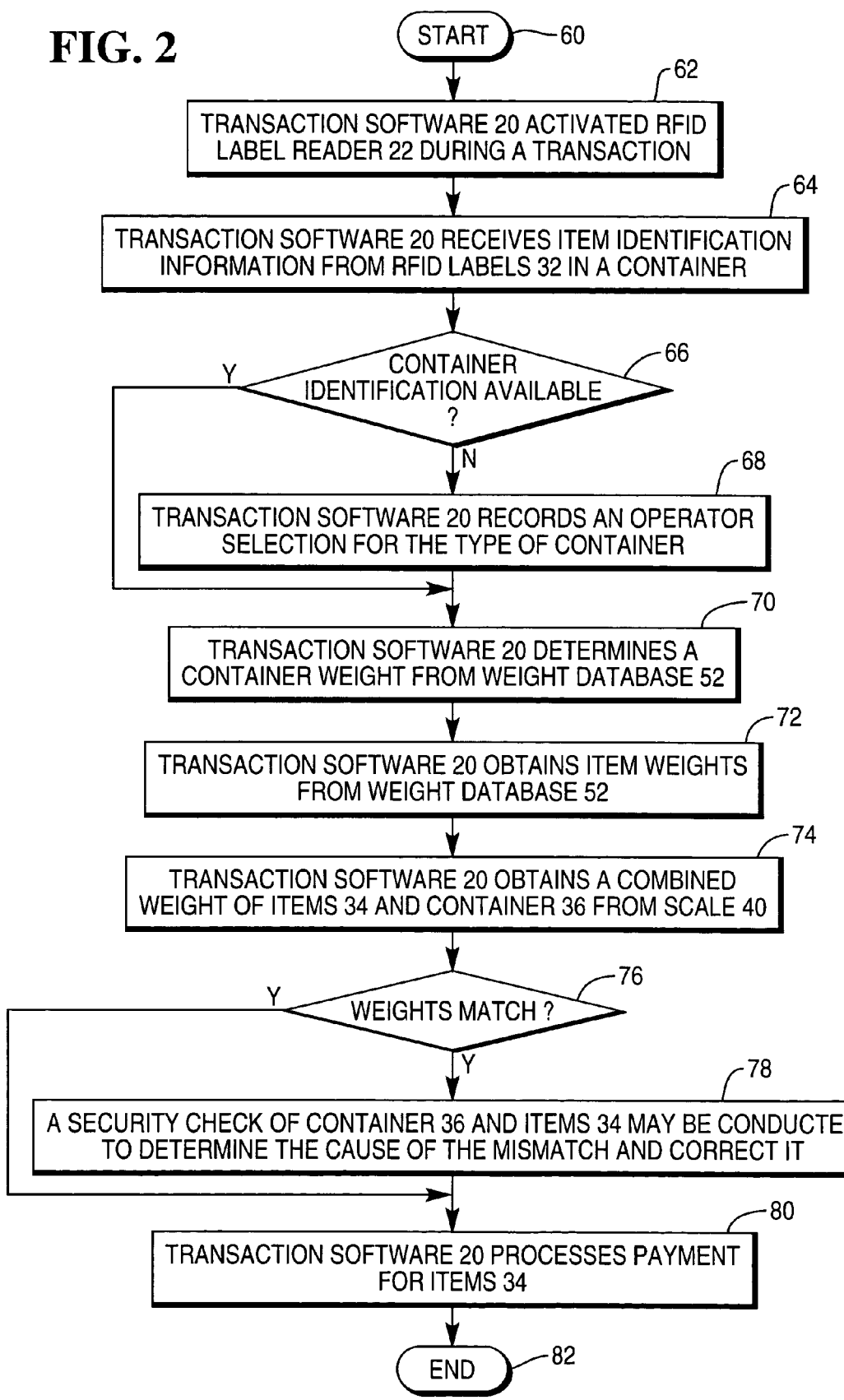

RFID WEIGHT-BASED SECURITY METHOD WITH CONTAINER COMPENSATION

BACKGROUND OF THE INVENTION

The present invention relates to security systems for store checkout and more specifically to a radio frequency identification (RFID) weight-based security method with container compensation.

RFID technology is frequently proposed as the next generation of point-of-sale technology. Its major advantage is that it can detect many items at a time as they pass through an RFID reader, which could make the typical checkout experience much faster and easier.

Conventional security methods involve individually identifying, weighing, and comparing weights of items with reference item weight information. These methods break down when a large number of items can be detected all at once. In this case, it makes no sense to sequentially scan items or even remove individual items from a shopping container.

Therefore, it would be desirable to an RFID weight-based security method with container compensation.

SUMMARY OF THE INVENTION

In accordance with the teachings of the present invention, a radio frequency identification (RFID) weight-based security method with container compensation is provided.

The security method includes receiving item identification information from RFID labels affixed to items in a container, obtaining a reference container weight, obtaining reference item weights using the item identification information, obtaining a combined weight of the items and the container from a scale, comparing the combined weight with the sum of the reference container weight and the reference item weights, and processing payment for the items if the combined weight is within a predetermined threshold of the sum of the reference container weight and the reference item weights.

It is accordingly an object of the present invention to provide an RFID weight-based security method with container compensation.

It is another object of the present invention to provide a security method which facilitates identifying and weighing items and containers together.

BRIEF DESCRIPTION OF THE DRAWINGS

Additional benefits and advantages of the present invention will become apparent to those skilled in the art to which this invention relates from the subsequent description of embodiments and the appended claims, taken in conjunction with the accompanying drawings, in which:

FIG. 1 is a block diagram of a transaction system; and

FIG. 2 is a flow diagram illustrating operation of the radio frequency identification (RFID) weight-based security method.

DETAILED DESCRIPTION

Referring now to FIG. 1, transaction system 10 includes transaction terminal 12 and transaction server 14.

Transaction terminal 12 executes transaction software 20, which identifies items 34, obtains their prices from price look-up (PLU) database 50, determines any promotions due from customer loyalty program database 54, and collects payment through payment device 28 during a transaction. Transaction terminal 12 identifies items 34 by causing radio frequency identification (RFID) label reader 22 to read RFID labels 30 on items 34. Transaction terminal 12 may include a full-service transaction terminal or a self-service transaction terminal. Transaction terminal 12 may be located near an exit.

Transaction terminal 12 also provides a security function by identifying container 36, obtaining weights of items 34 and container 36 from scale 40, obtaining corresponding weight information from weight database 52, and comparing the scale weight with the combined weights of items 34 and container 36 from weight database 52. Transaction terminal 12 identifies container 36 by causing RFID label reader 22 to read RFID label 32 on container 36 and obtain container identification information.

Weight database 52 stores individual container weights. Weight database 52 may be updated to track changes in container weights resulting from use and aging. In another embodiment, weight database 52 may include an artificial intelligence or learning database that is programmed to predict changes in container weights over time and automatically update the container weights. In yet another embodiment, weight database 52 may store a less accurate average weight of similar containers 36.

Example containers 36 include shopping carts, shopping baskets, paper bags, and plastic bags. Some types of containers 36 may not include RFID labels 32. If transaction terminal 12 fails to identify container 36, then transaction terminal 12 may be programmed to use a predetermined average weight based upon a selected container type or assume that container 36 has an insignificant weight.

In one embodiment, containers 36 may be owned by a transaction establishment. In another embodiment, containers 36 may be owned by customers. In the latter embodiment, customers may register themselves and their containers 36 with a customer loyalty program of a transaction establishment to allow the transaction establishment to identify the customers and to help automate their checkout experiences. Customer names, customer container identification information, and customer container weights may be stored within customer loyalty program database 54. During each transaction, transaction software 20 determines whether a promotion is due based upon receipt of identification information of a container 36 belonging to a customer who is a member of the customer loyalty program.

To assist with tasks required during the transaction, system 10 further includes input device 24 and display 26.

Input device 24 records operator selections.

Display 26 displays selection information and information to assist the operator in using transaction terminal 12, under the control of transaction software 20.

Payment device 28 may include a card reader, such as a smart, debit, or credit card reader. Payment device 28 may also include a cash drawer or a cash acceptor and a cash dispenser, or a check reader.

RFID labels 30 and 32 may be visible or hidden when attached to items 34 and container 36. RFID labels 30 and 32 may be active or passive RFID labels. RFID reader 22 may either obtain item and container identification information directly from RFID labels 30 and 32, or from the associated databases such as 50 and 52. In the latter case, RFID label reader 22 obtains a unique signature from RFID labels 30 and 32, which transaction software compares to a table of item identifications to identify items 34 and container 36. The table of item identifications may be part of PLU database 50 or be a separate database.

Scale 40 records a combined weight of items 34 and container 36. Scale 40 may include a floor scale for shopping carts or a countertop scale for baskets or bags.

Transaction server stores PLU database 50, weight database 52, and customer loyalty program database 54. Databases 50-54 may be separate databases or combined into a single database or combined into other possible combinations.

Turning now to FIG. 2, a security method is illustrated in detail beginning with Start 60.

In step 62, transaction software 20 activated RFID label reader 22 during a transaction.

In step 64, transaction software 20 receives item identification information from RFID labels 32 in a container.

In step 66, transaction software 20 determines whether container identification information is available from RFID label reader 22, for example, by looking for a tag 34 which corresponds to a container 36. If so, operation proceeds to step 70. Otherwise, operation proceeds to step 68.

In step 68, transaction software 20 records an operator selection for the type of container.

In step 70, transaction software 20 determines a container weight from weight database 52. If container identification is available, transaction software 20 uses the container identification information to obtain the container weight. If container identification information is not available, transaction software use the recorded container type to obtain an average weight for the container type from weight database 52. The average weight may be insignificantly low for some container types.

In step 72, transaction software 20 obtains item weights from weight database 52. Transaction software 20 uses the item identification information to obtain the item weights from weight database 52.

In step 74, transaction software 20 obtains a combined weight of items 34 and container 36 from scale 40.

In step 76, transaction software 20 compares the scale weight with the combined weights from weight database 52. If the scale weight matches the combined weights from weight database 52 within a predetermined threshold, operation proceeds to step 80. Otherwise, a security check of container 36 and items 34 may be conducted to determine the cause of the mismatch and correct it in step 78.

In step 80, transaction software 20 processes payment for items 34.

In step 82, operation ends.

Advantageously, the security method provides an automated method for loss-prevention at every transaction, a method which is better than random audits of container contents. The method minimizes the need for shoppers to remove items 34 from containers 36 in order to complete the checkout process. Further, the method leverages current weight-based security solution by extending weight database 52 to include identification information associated with RFID labels 32 of containers 36. Finally, the method allows a retailer to continue using its current carts and baskets by affixing RFID labels 32 to them.

Although the invention has been described with particular reference to certain embodiments thereof, variations and modifications of the present invention can be effected within the spirit and scope of the following claims.

What is claimed is:

1. A method for securing a transaction comprising:
   a) receiving item identification information from RFID labels associated with one or more items in a container;
   b) obtaining reference item weights using the item identification information;
   c) identifying a type of the container;
   d) obtaining a typical container weight for the identified type of container;
   e) obtaining a combined weight of the items and the container from a scale;
   f) comparing the combined weight with the sum of the reference item weights and the typical container weight; and
   g) processing payment for the items if the combined weight is within a predetermined threshold of the sum of the reference item weights and the typical container weight.

2. The method of claim 1, wherein identifying the type of the container comprises receiving container type information from a RFID label associated with the container.

3. The method of claim 1, wherein identifying the type of the container comprises manually selecting the type of the container by an operator.

4. The method of claim 1, wherein identifying the type of the container comprises:
   determining if container type information is available from a RFID label associated with the container, and
   manually selecting the type of the container by an operator if the container type information is not available from a RFD label associated with the container.

5. The method of claim 1, wherein the type of the container is one of a shopping cart, shopping basket, paper bag and plastic bag.

6. A transaction security system comprising:
   a RFID label reader;
   a scale; and
   a transaction terminal operably connected to the RFID label reader and the scale, and wherein the transaction terminal is adapted to:
   a) receive item identification information from RFID labels associated with one or more items in a container;
   b) obtain reference item weights using the item identification information;
   c) identify a type of the container,
   d) obtain a typical container weight for the identified type of container,
   e) obtain a combined weight of the items and the container from a scale;
   f) compare the combined weight with the sum of the reference item weights and the typical container weight; and
   g) process payment for the items if the combined weight is within a predetermined threshold of the sum of the reference item weights and the typical container weight.

7. The system of claim 6, wherein the transaction terminal is adapted receive container type information from a RFID label associated with the container in order to identify the type of the container.

8. The system of claim 6, wherein the transaction terminal is adapted to allow an operator to manually select the type of the container in order to identify the type of the container.

9. The system of claim 6, wherein the transaction terminal is adapted to:
   determine if container type information is available from a RFID label associated with the container; and
   allow an operator to manually select the type of the container if the container type information is not available from a RFID label associated with the container, in order to identify the type of the container.

10. The system of claim 6, wherein the type of the container is one of a shopping cart, shopping basket, paper bag and plastic bag.

11. The system of claim 6, further comprising a database adapted to store the reference item weights and the typical container weight.

12. The system of claim 11, wherein the database is further adapted to predict changes in the typical container weight resulting from use and age.

* * * * *